United States Patent
Simmons et al.

(10) Patent No.: US 7,666,289 B2
(45) Date of Patent: Feb. 23, 2010

(54) METHODS AND DEVICES FOR HIGH-THROUGHPUT DIELECTROPHORETIC CONCENTRATION

(75) Inventors: Blake A. Simmons, San Francisco, CA (US); Eric B. Cummings, Livermore, CA (US); Gregory J. Fiechtner, Germantown, MD (US); Yolanda Fintschenko, Livermore, CA (US); Gregory J. McGraw, Ann Arbor, MI (US); Allen Salmi, Escalon, CA (US)

(73) Assignee: Sandia Corporation, Livermore, CA (US)

( * ) Notice: Subject to any disclaimer, the term of this patent is extended or adjusted under 35 U.S.C. 154(b) by 58 days.

(21) Appl. No.: 12/202,489

(22) Filed: Sep. 2, 2008

(65) Prior Publication Data

US 2009/0045064 A1 Feb. 19, 2009

Related U.S. Application Data

(63) Continuation of application No. 11/076,971, filed on Mar. 11, 2005, now abandoned.

(51) Int. Cl.
- B03C 5/02 (2006.01)
- G01N 27/00 (2006.01)
- B01D 63/00 (2006.01)

(52) U.S. Cl. .................. 204/643; 204/600; 204/627; 210/321.75

(58) Field of Classification Search .......... 204/547, 204/515, 451, 643, 600, 627; 209/210; 422/50, 422/68.1; 536/23.1; 210/321.6, 321.75

See application file for complete search history.

(56) References Cited

U.S. PATENT DOCUMENTS

| | | | |
|---|---|---|---|
| 3,706,614 A | 12/1972 | Kirkpatrick | |
| 5,403,455 A * | 4/1995 | Candor | 204/515 |
| 5,560,811 A * | 10/1996 | Briggs et al. | 204/451 |
| 5,858,192 A | 1/1999 | Becker | |
| 5,979,670 A | 11/1999 | Ditter | |
| 6,267,898 B1 | 7/2001 | Fukuda | |
| 6,648,147 B1 | 11/2003 | Lydon | |
| 6,780,584 B1 | 8/2004 | Edman | |
| 6,905,029 B2 | 6/2005 | Flagan | |
| 7,198,702 B1 * | 4/2007 | Washizu et al. | 204/547 |
| 7,537,809 B2 * | 5/2009 | Ochiai et al. | 427/580 |

OTHER PUBLICATIONS

M. P. Hughes; H. Morgan; F. J. Rixon; J. P.H. Burt; R. Pethig; "Manipulation of herpes simplex virus type 1 by dielectrophoresis", Biochimica et Biophysica Acta 1425, 1998, pp. 119-126.

(Continued)

*Primary Examiner*—Ana M Fortuna
(74) *Attorney, Agent, or Firm*—Smith, Gambrell & Russell, LLP; Timothy P. Evans

(57) ABSTRACT

Disclosed herein are methods and devices for assaying and concentrating analytes in a fluid sample using dielectrophoresis. As disclosed, the methods and devices utilize substrates having a plurality of pores through which analytes can be selectively prevented from passing, or inhibited, on application of an appropriate electric field waveform. The pores of the substrate produce nonuniform electric field having local extrema located near the pores. These nonuniform fields drive dielectrophoresis, which produces the inhibition. Arrangements of electrodes and porous substrates support continuous, bulk, multi-dimensional, and staged selective concentration.

16 Claims, 12 Drawing Sheets

OTHER PUBLICATIONS

H. A. Pohl; "The Motion and Precipitation of Suspensoids in Divergent Electric Fields", Journal of Applied Physics, 1951, vol. 22, No. 7, pp. 869-871.

Y. Huang; X-B. Wang; F. F. Becker; P. R.C. Gascoyne; "Introducing Dielectrophoresis as a New Force Field for Field-Flow Fractionation", Biophysical Journal, 1997, vol. 73, pp. 1118-1129.

J. Yang; Y. Huang; X-B. Wang; F. F. Becker; P. R.C. Gascoyne; "Cell Separation on Microfabricated Electrodes Using Dielectrophoretic/ Gravitational Field-Flow Fractionation", Analytical Chemistry, 1999, vol. 71, pp. 911-918.

E. B. Cummings; A. K. Singh; "Dielectrophoresis in Microchips Containing Arrays of Insulating Posts: Theoretical and Experimental Results", Analytical Chemistry, 2003, vol. 75, pp. 4724-4731.

B. H. Lapizco-Encinas; B. A. Simmons; E. B. Cummings; Y. Fintschenko; "Insulator-based dielectrophoresis for the selective concentration and separation of live bacteria in water", Electrophoresis 2004, vol. 25, pp. 1695-1704.

B. H. Lapizco-Encinas; B. A. Simmons; E. B. Cummings; Y. Fintschenko; "Dielectrophoretic Concentration and Separation of Live and Dead Bacteria in an Array of Insulators", Analytical Chemistry, 2004, vol. 76, pp. 1571-1579.

* cited by examiner

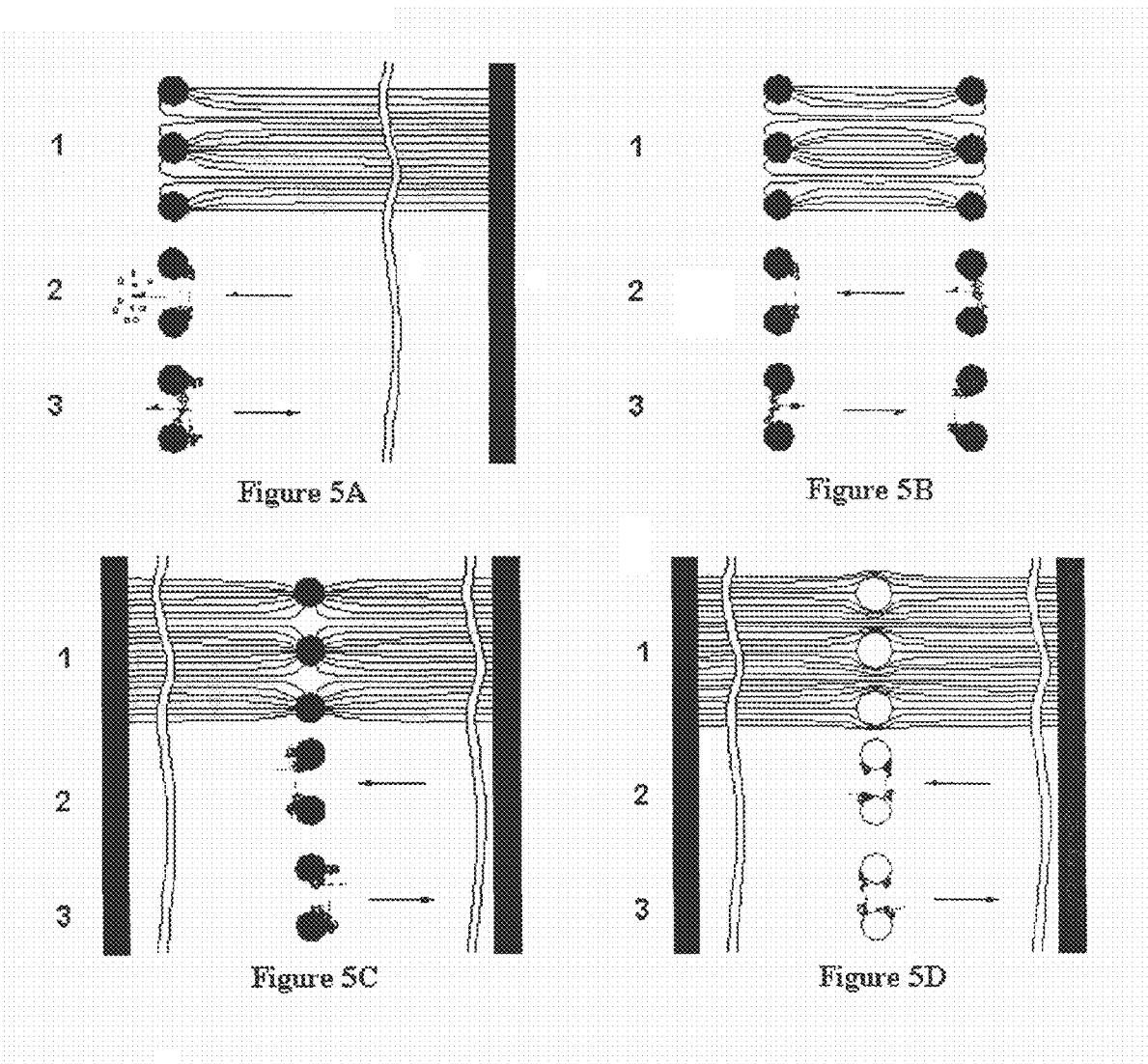

METHODS AND DEVICES FOR HIGH-THROUGHPUT DIELECTROPHORETIC CONCENTRATION

CROSS-REFERENCE TO RELATED APPLICATIONS

This application is a Continuation application of prior U.S. patent application Ser. No. 11/076,971, originally filed Mar. 11, 2005 now abandoned and entitled "Methods and Devices for High-Throughput Dielectrophoretic Concentration," from which priority is claimed and which is herein incorporated by reference in its entirety

ACKNOWLEDGEMENT OF GOVERNMENT SUPPORT

This invention was made with Government support under government contract DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

1. Field of the Invention

The present invention generally relates to dielectrophoresis and its application in analytical devices and filtration technologies.

2. Description of the Related Art

Dielectrophoresis (DEP) is the motion of particles caused by the effects of conduction and dielectric polarization in non-uniform electric fields. Unlike electrophoresis, where the force acting on a particle is determined by its net charge, the dielectrophoretic force depends on the geometrical, conductive, and dielectric properties of the particle. A complex conductivity of a medium can be defined as $\sigma^* = \sigma + i\omega \in$, where $\sigma$ is the real conductivity and $\in$ is the permittivity of the medium, i is the square root of $-1$, and $\sigma^*$ is the angular frequency of the applied electric field, E. According to well-known theory, the dielectrophoretic force is proportional to the differences in complex conductivity of the particle and suspending liquid and square of the applied electric field. Without being bound by theory, for a spherical particle of radius r, the DEP force, $F_{DEP}$ is given by $$F_{DEP} = 2\pi r^3 \in_m \mathrm{Re}[f_{CM}] \nabla E^2$$

where $\in_m$ is the absolute permittivity of the suspending medium, E is the local (rms) electric field, $\nabla$ the del vector operator and $\mathrm{Re}[f_{CM}]$ is the real part of the Clausius-Mossotti factor, defined as:

$$f_{CM} = \frac{\sigma_p^* - \sigma_m^*}{\sigma_p^* + 2\sigma_m^*}$$

where $\sigma^*_p$ and $\sigma^*_m$ are the complex conductivities of the particle and medium respectively, as described in Hughes, et al. (1998) *Biochimica et Biophysica Acta* 1425: 119-126, which is herein incorporated by reference. Depending on the relative conductivities of the particle and medium, the Clausius-Mossotti factor can be positive, n resulting in a force toward stronger electric fields, or negative, resulting in a force away from stronger electric fields. The particle motion toward and away from stronger electric fields is called, respectively, positive and negative DEP.

Thus, when a particle is exposed to a non-uniform electric field, it experiences dielectrophoretic forces resulting from conduction and polarization that scale with the electric field intensity. The magnitude, sign, and phase of these forces depend on the frequency of the applied field and electrical properties of the particle and medium, such as conductivity, permittivity, morphology and shape of the particle. Thus dielectrophoresis can be used to sort and move particles selectively. See Pohl, H. A., J. Appl. Phys., 22:869-871; Pohl, H. A., *Dielectrophoresis*, Cambridge University Press (1978); Huang Y., R. C. Gascoyne et al., *Biophysical Journal*, 73:1118-1129; Wang X. B., Gascoyne, R. C., *Anal. Chem.* 71:911-918, 1999; and U.S. Pat. No. 5,858,192, all of which are hereby incorporated by reference.

Insulator-based (electrodeless) dielectrophoresis (iDEP) has been previously described and utilized for the selective concentration and separation of analytes in microfluidic devices. See Cummings and Singh (2003) *Anal. Chem.* 75:4724-4731, Lapizco-Encinas, et al. (2004) *Electrophoresis* 25:1695-1704, and Lapizco-Encinas, et al. (2004) *Anal. Chem.* 76:1571-1579, which are herein incorporated by reference. These devices use spatially nonuniform insulating structures to generate the nonuniform electric field needed to drive DEP. These iDEP devices are practically limited to processing microliter volumes and require microfabrication. Prior art devices and methods employing iDEP may be used effectively for systems that process such small volume samples, but are ineffective for real-time monitoring and analysis of large volumes and flows, e.g., flow rates greater than one liter of per hour.

Thus, a need exists for methods and devices that allow dielectrophoretic based assays of large volumes and high flow rates.

SUMMARY OF THE INVENTION

The present invention provides a substrate comprising a plurality of pores and a nonuniform electric field having local extrema located near the pores. In some embodiments, the substrate is a membrane, a film, or a filter. In some embodiments, the substrate is a woven structure of a plurality of fibers. In some embodiments, the substrate is a non-woven structure of a plurality of fibers. In some embodiments, the substrate is a plurality of aligned fibers. In some embodiments, the substrate comprises a material with insulative properties. In some embodiments, the substrate comprises a material with conductive properties.

In some embodiments, the present invention provides a device for assaying, inhibiting, or concentrating analytes in a fluid sample which comprises at least one assembly comprising at least one substrate having a plurality of pores capable of a nonuniform electric field gradient having local extrema located near the pores in the presence of an applied field and at least one electrode. In some embodiments, the analytes having a size larger than the pores are physically entrapped on one side of the substrate. In some embodiments, the analytes having a size smaller than the pores pass though the pores of the substrate. In some embodiments, the analytes are immobilized on or constrained in a given area from the surface of the substrate due to dielectrophoretic forces. In some embodiments, the substrate is a membrane, a film, or a filter. In some embodiments, the substrate is a woven structure of a plurality of fibers. In some embodiments, the substrate is a non-woven structure of a plurality of fibers. In some embodiments, the substrate is a plurality of aligned fibers. In some embodiments, the substrate comprises a material with insulative properties. In some embodiments, the substrate comprises a material with conductive properties. In some embodiments, the assembly comprises at least one spacer. In some embodiments, the device comprises two or more assemblies. In some embodiments, the device further comprises at least one component selected from the group consisting of a fluid inlet, a fluid outlet, a substrate housing, a gasket, an insert, a viewing area, a delivery device, a collection device, a spacer, and a valve. In some embodiments, the electrode is a pin electrode or a wire mesh. In some embodiments, the electrode is a remote electrode. In some embodiments, the substrate is transverse to the flow of the fluid sample. In some embodiments, the substrate is substantially normal to substantially aligned with the flow of the fluid sample. In some embodiments, the substrate is about 80 degree incidence to about 10 degree incidence to the flow of the fluid sample.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

This invention is further understood by reference to the drawings wherein:

FIG. 5A shows a symmetric porous electrode/remote or planar electrode. 1: Electric field lines. 2: Particle locations for flow from right to left. 3: Particle locations for flow from left to right.

FIG. 5B shows an asymmetric porous electrode pair. 1: Electric field lines. 2: Particle locations for flow from right to left. 3: Particle locations for flow from left to right.

FIG. 5C shows symmetric planar or remote electrode pair with a conductive porous element. 1: Electric field lines. 2: Particle locations for flow from right to left. 3: Particle locations for flow from left to right.

FIG. 5D shows symmetric planar or remote electrode pair with an insulative porous element. 1: Electric field lines. 2: Particle locations for flow from right to left. 3: Particle locations for flow from left to right.

DETAILED DESCRIPTION OF THE INVENTION

Figure 1A:
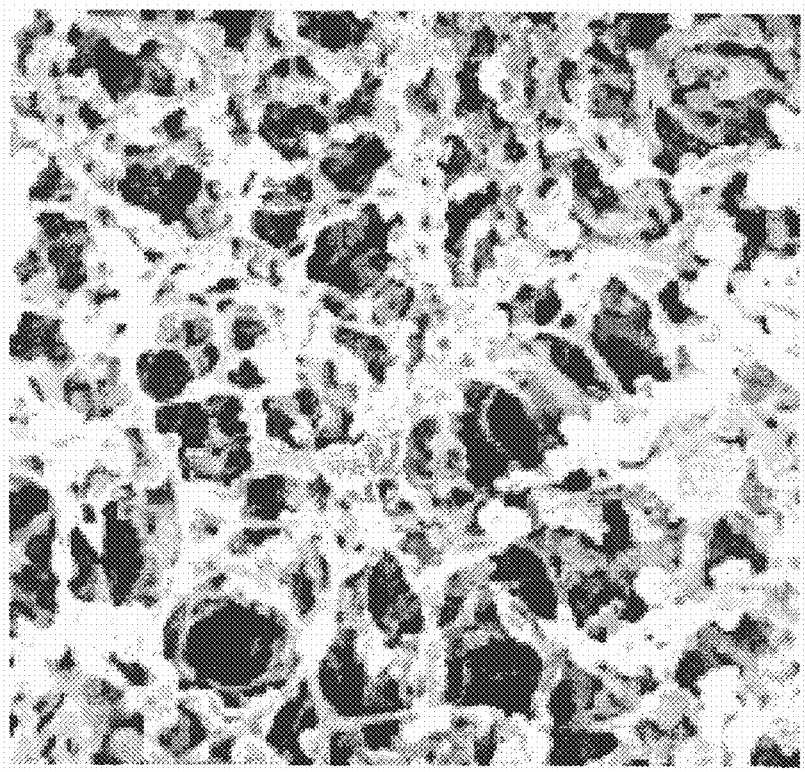
FIG. 1A shows an example of a porous substrate, a phase separated membrane.

The present invention generally relates to methods and devices for use in assays and separation applications utilizing dielectrophoresis for screening, isolating, or concentrating selected particles from a fluid flow system.

In some embodiments, the present invention employs a porous substrate comprising a plurality of pores and an applied electric field such that the pores produce a nonuniform electric field having local extrema near the pores. In various embodiments, the substrate is a membrane, sheet, film, woven structure of a plurality of fibers, nonwoven structure of a plurality of fibers, irregularly spaced array of substantially aligned fibers, or substantially regularly spaced array of substantially aligned fibers. In some embodiments, the substrate comprises a material with insulative properties. In some embodiments, the substrate comprises a material with conductive properties.

The substrates can inhibit particle motion selectively based on the physical and dielectrophoretic properties of the particle. Inhibited particles are constrained to the immediate vicinity of the substrate. By forcing particle-laden fluid through the substrate, inhibition selectively concentrates the particles. If the substrate is arranged so that there is a tangential flow component, particles that are inhibited from crossing the substrate may yet be mobile to flow tangentially along the substrate. This arrangement facilitates "continuous" particle concentration: the system can continuously deliver a stream of selected, concentrated particles to a port or local region of the device.

The invention requires at least two electrodes to apply the electric field and at least one porous substrate. In some embodiments, one of the two electrodes may be the porous substrate. In some embodiments, one or more physically remote electrodes are used. If the substrate comprises a conductive material, in some embodiments the substrate is held at a potential, frequency, and/or phase different from that of another electrode or electrodes so the substrate itself is an electrode. In other embodiments, the substrate is in electrical communication only with the liquid. In some embodiments elements of the invention are sandwiched into assemblies. Various embodiments of these assemblies have wide spacers to separate and substantially isolate the elements, narrow spacers to provide partial isolation, or no spacers so that different elements contact each other.

These assemblies are arranged and housed in a variety of ways to effect selective batch (pulsed) concentration, continuous concentration, or hybrid continuous and batch concentration. Some embodiments employ assemblies or substrates held transverse to the flow. Other embodiments employ assemblies or substrates that are tilted. In some embodiments, the range of the tilt angles is substantially normal to the flow direction to substantially aligned with the flow. In some embodiments, the range of the tilt angles is from about 80 degree incidence to about 10 degree incidence, i.e. between about 10 and 180 degrees with respect to the flow to force inhibited particles to flow along the substrate to be continuously spilled at the downstream end of the assembly. This results in a one-dimensional concentration or immobilization, effecting a two-dimensional concentration (one spatial dimension and time). In some embodiments, the preferred highest incidence is one that allows particles to flow tangentially rather than becoming immobilized. In some embodiments, the lowest incidence angles are selected based on a given throughput and compact architecture design of a desired device. One skilled in the art may readily select suitable minimum and maximum incidence angles in a given device architecture, e.g. a desired porous substrate and electrode arrangement. Other embodiments use two-dimensional focusing geometries, e.g. conical assemblies, to effect a two-dimensional continuous concentration or three-dimensional batch concentration, supporting high concentration factors.

The present invention provides a substrate comprising a plurality of pores and a nonuniform electric field having local extrema located near pores which drive dielectrophoretic separation of particles in a fluid.

The present invention also provides methods and devices for DEP-based assays which combine filtration technology and dielectrophoresis for high-throughput assays of analytes in fluid samples. Specifically, the present invention provides methods and devices which employ at least one substrate comprising a plurality of pores and a nonuniform electric field having local extrema located near pores. The methods and devices of the present invention may be used for concentrating, assaying, isolating, or filtering analytes from fluid samples having high flow rates and volumes.

As used herein, an "analyte" refers to a particle that may be natural or synthetic and includes chemicals and biomolecules, such as amino acids, peptides, proteins, nucleotides, nucleic acids, carbohydrates, lipids, cells, viral particles, bacteria, spores, protozoa, yeast, mold, fungi, pollen, diatoms, and the like, and ligands, supermolecular assemblies, catalytic particles, zeolites, and the like.

As used herein, a "fluid" refers to a continuous substance that tends to flow and to conform to the outline of a container such as a liquid or a gas. Fluids include saliva, mucus, blood, plasma, urine, bile, breast milk, semen, water, liquid beverages, cooking oils, cleaning solvents, ionic fluids, air, and the like. Fluids can also exist in a thermodynamic state near the critical point, as in supercritical fluids. If one desires to test a solid sample for a given analyte according to the present invention, the solid sample may be made into a fluid sample using methods known in the art. For example, a solid sample may be dissolved in an aqueous solution, ground up or liquefied, dispersed in a liquid medium, melted, digested, and the like. Alternatively, the surface of the solid sample may be tested by washing the surface with a solution such as water or a buffer and then testing the solution for the presence of the given analyte.

As used herein, "concentrating" refers to the reduction of fluid volume per particle in the fluid. The methods and devices of the present invention allow a fluid to be concentrated or diluted. When the methods and devices are used to concentrate a fluid, it is noted that particles in one portion of the fluid becomes "concentrated" and that particles in the second portion of the fluid becomes "diluted". Prior art devices employing filters concentrate and separate selectively based on size separation. Thus, the prior art devices cannot deliver a concentrate downstream of the filtration element, i.e. filter. The methods and devices of the present invention allow batch or continuous concentration or dilution wherein the concentrate or diluent may be delivered downstream of the porous substrate.

As used herein, "spatial separation", "physical separation", and "size separation" are used interchangeably to refer to the process by which a particle is filtered, concentrated, immobilized, retarded, or advanced according to the physical shape and size of the particle. As used herein, "assaying" is used interchangeably with "detecting", "measuring", "monitoring" and "analyzing"

As used herein, the word "conductivity" is used to describe the ease of flow of both conduction and displacement current. It is often mathematically described as a complex number that varies with the frequency of the applied electric field. Similarly, "conduction" is used to describe both conventional conduction and conduction of displacement currents.

The term "pore" is used to describe an opening, such as a hole, an opening or an interstitial space in an object, such as the substrate of the present invention, through which fluid can flow.

The term "porous" is used to describe a material or assembly having a plurality of pores through which fluid can flow.

THE SUBSTRATE: The present invention provides a substrate comprising a plurality of pores and an applied electric field such that the pores produce a nonuniform electric field having local extrema near the pores. The substrate may be a membrane, sheet, film, a woven structure of a plurality of fibers, non-woven structure of a plurality of fibers, irregularly spaced array of substantially aligned fibers, or substantially regularly spaced array of substantially aligned fibers. The substrate may comprise a material with insulative properties. The substrate may comprise a material with conductive properties.

As used herein, "insulative" and "conductive" refers to the relative conductivity of the described item with respect to the fluid being concentrated or diluted according to the methods of the present invention. Insulative materials having relatively low conductivity include plastics, epoxies, photoresists, polymers, silicon, silica, quartz, glass, controlled pore glass, carbon, and the like, and combinations thereof. Preferred insulative materials include thermoplastic polymers such as nylon, polypropylene, polyester, polycarbonate and the like. Conductive materials, in comparison, have relatively high conductivity. Conductive materials include bulk, sputtered, and plated metals and semiconductors, carbon nanotubes, and the like.

As provided herein, the methods and devices of the present invention utilize substrates having pores that selectively restrain the transport of particles. When an electric field is applied across the substrate, the pores create a nonuniform electric field having local extrema near the pores. These field nonuniformities attract or repel particles from the substrate dielectrophoretically, according to the geometrical and electrical properties of the particles. Thus, the present invention provides methods and devices for physical separations and assays. The substrates may be films, membranes, sheets, meshes, webs, and the like. The substrates may be produced by methods known in the art.

Figure 1B:
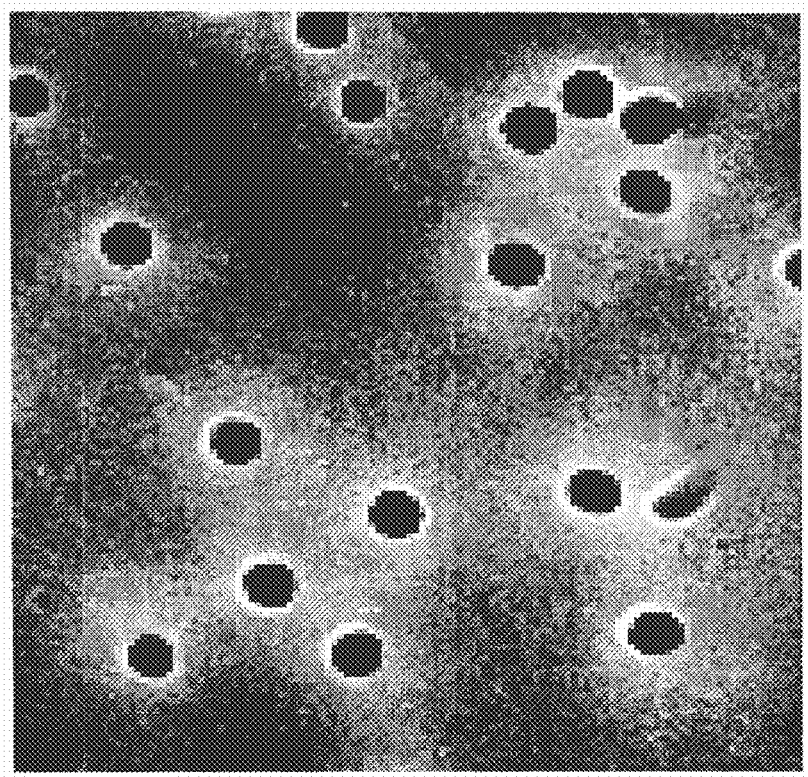
FIG. 1B shows an example of a porous substrate, a track etched membrane.

HOLES AND PORES: The substrate may comprise a plurality of holes and passages through which fluid may flow. Examples of such substrates include phase-separated, dialysis, ion-exchange, and track-etched membranes, conductive or insulative woven cloths, commercial membranes such as those developed for standard filtration applications with varying effective porosity ranging from 0.02 micrometers to well over 100 micrometers, and the like. FIG. 1A shows the typical morphology of a phase separated membrane and FIG. 1B shows the typical morphology of a track etched membrane.

INTERSTICES AS PORES: Alternatively, the substrates may comprise a plurality of fibers. These fibers may be woven or non-woven structures in regular or irregular patterns having pathways through which fluid may flow. In some embodiments, the fibers may be substantially aligned. In some embodiments, the fibers may be regularly or irregularly spaced. Commercially available porous substrates that are suitable according to the present invention include monofilament nylon and polypropylene membranes having 5, 20, 50 and 105 micrometer pores, available from Small Parts (Miami Lakes, Fla.). Other porous membranes and substrates known in the art having similar pore sizes may be employed.

PORE SIZE DISTRIBUTION: The size of the pores may be narrowly, broadly, or multi-modally distributed. In some embodiments, the substrate has pores of a single size or narrow size range. As used herein, "narrow size distribution" is typically held at a standard deviation value that is less than about 5 to about 8% of the mean value. Thus, for about a 20 micron pore size, it will have a standard deviation of less than about 2 microns in the average pore size. This is what is typically held true for the monofilament membranes and the track-etch membranes. The other porous membranes (phase separated in origin) may have much larger distributions that can vary as much as about 20 to about 30% because they have much longer path lengths through which an analyte must traverse. In some embodiments, the substrate has pores of various sizes and size ranges. In some embodiments, the pore sizes range from about 1 to about 200 microns. In some embodiments, the pore sizes of the substrate are in a graduated configuration, e.g. three porous elements linked in series in the flow path to allow for three distinct DEP separations.

SURFACE MODIFICATION: The chemical and electrical properties of the surfaces of the substrates may be modified using methods known in the art. For example, a coating comprising a desired agent such as an antibody or compound may be chemically or physically applied to the surface, tailored monolayers, self-assembled monolayers, or both may be applied to the surface, or the surface may be oxidized or functionalized using methods known in the art. Suitable surface modifications include fluorination, plasma chemical modifications, plasma modifications, surface initiated polymerizations, UV-initiated polymerizations, thermally initiated polymerization, dynamic surface coatings such as surfactants, epoxilation, sulfonation, silanation, amination, and the like.

DIELECTROPHORETIC INHIBITION: The present invention provides methods for selectively concentrating, assaying, or filtering analytes in a fluid which comprises exposing the analytes to a nonuniform electric field produced by a substrate having a plurality of pores. Particles in a fluid experience dielectrophoretic forces from these nonuniform electric fields. This force depends on particle geometry and the relative conductivity of the particle and immersion liquid. If the dielectrophoretic force is sufficiently high to overcome flow or mobilization field forces that act to push the particle though the substrate, particles are "inhibited". As used herein, the term "inhibition" is used to describe dielectrophoretic effects that cause particles to resist the mobilization field and remain constrained to a given object or area. Inhibition occurs two ways: by "depletion" and "enhancement", depending on the relative conductivities of the particle, fluid, and substrate. The substrates can inhibit particle motion selectively based on the physical structure of the particle. Inhibited particles are constrained to the immediate vicinity of the substrate. By forcing particle-laden fluid through the substrate, inhibition selectively concentrates the particles. The applied field need not be chosen to trap particles, but can simply delay them on passage through substrate or the immediate vicinity of the substrate, such that various particles exit a device comprising the substrate in given amounts and times similar to chromatography devices.

As used herein, the term "mobilization field" refers to any force field that influences a particle to pass through an object or an area, such as the substrate according to the present invention. Mobilization fields include hydrodynamic flow fields produced by pressure differences, gravity, linear or centripetal acceleration, electrokinetic flow fields, magnetophoretic and thermophoretic flow fields, and others known in the art.

FIGS. 2 through 7 are schematic representations of the substrates according to the present invention. The elements depicted in the FIGURES are as follows: The relative conductivity of an object is depicted by its grayscale. White objects are insulators. Black objects are conductors. Where shown, the solid straight arrows show the direction of the fluid flow/mobilization force. The dotted straight arrows show the direction of the dielectrophoretic force. The dashed straight arrows show the particle flow direction. The solid curved arrows show the electric field lines. The shaded circles depict particles, and, again, their average grayscale depicts their conductivity.

Figure 2A:
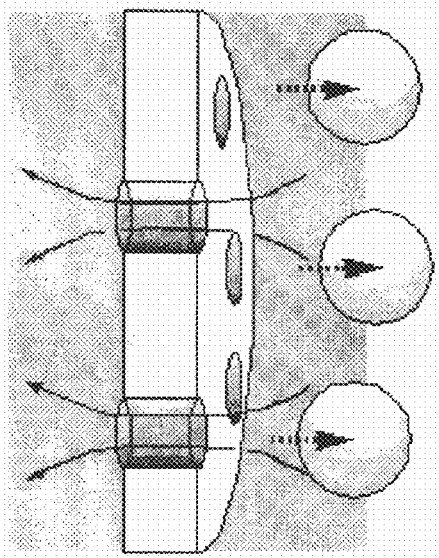
FIG. 2A shows dielectrophoretic depletion wherein the negative DEP of particles is larger than the pore diameter, insulative substrate.
Figure 2B:
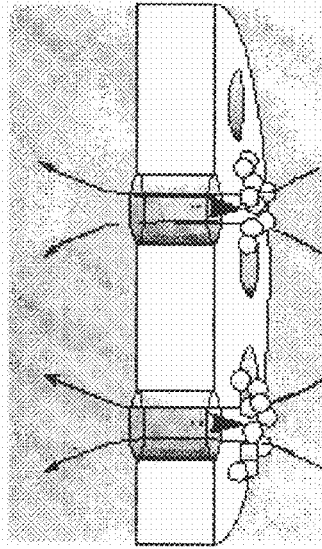
FIG. 2B shows dielectrophoretic depletion wherein DEP of particles is smaller than the pore diameter, insulative substrate.
Figure 2C:
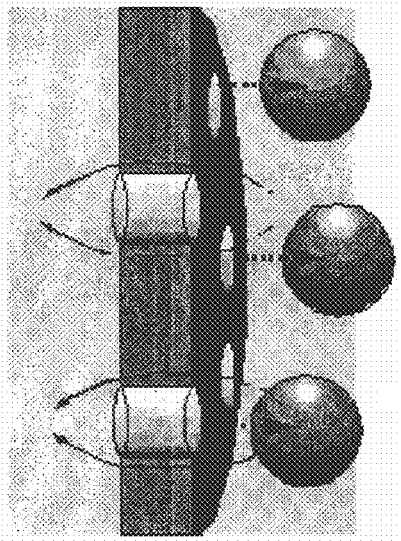
FIG. 2C shows dielectrophoretic depletion wherein positive DEP of particles is larger than the pore diameter, conductive substrate.
Figure 2D:
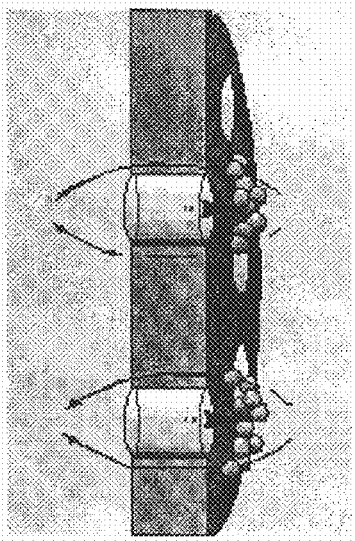
FIG. 2D shows dielectrophoretic depletion wherein positive DEP of particles is smaller than the pore diameter, conductive substrate.
Figure 3A:
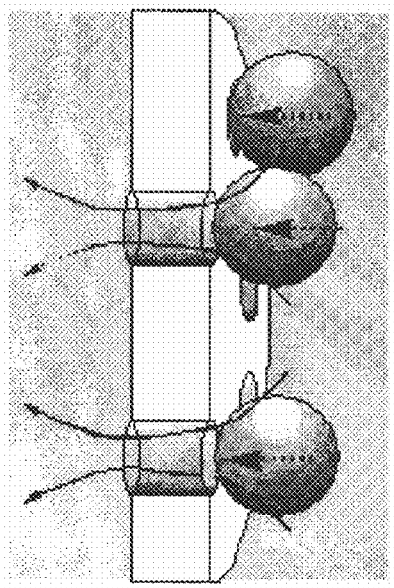
FIG. 3A shows dielectrophoretic enhancement wherein positive DEP of particles is larger than the pore diameter, insulative substrate.
Figure 3B:
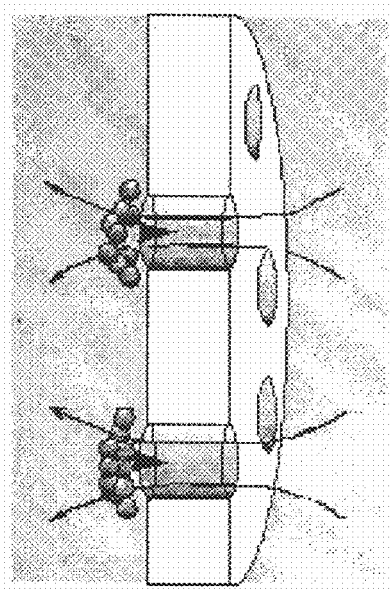
FIG. 3B shows dielectrophoretic enhancement wherein positive DEP of particles is smaller than the pore diameter, insulative substrate.
Figure 3C:
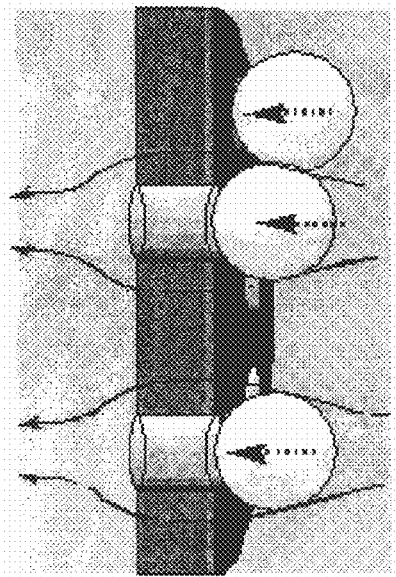
FIG. 3C shows dielectrophoretic enhancement wherein negative DEP of particles is larger than the pore diameter, conductive substrate.
Figure 3D:
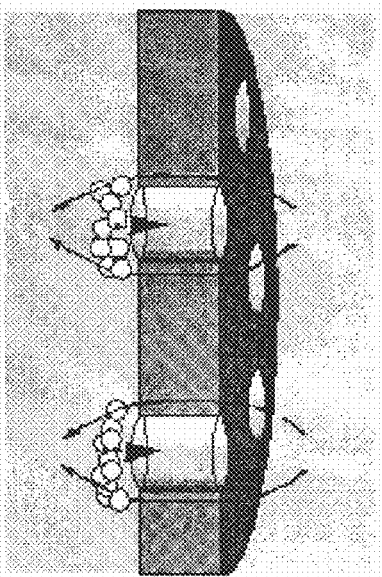
FIG. 3D shows negative DEP of particles is smaller than the pore diameter, conductive substrate.

DEPLETION: In "depletion," analytes are repelled from the substrate pores. As diagrammed in FIG. 2, this depletion effect inhibits particles by confining them to the upstream side of the substrate. The repelled particles can be larger or similar to the pore size (FIGS. 2A and 2C) or smaller than the pores (FIGS. 2B and 2D). If the particles are smaller than the pores, lowering or releasing the electric field will permit the particles to pass through the pores. If the particles are larger than the pores, lowering the electric field will allow the particles to settle into mechanical contact with the pores in the manner of a conventional membrane filter. This dielectrophoretic repulsion depletes particles from the pores and occurs when the porous substrate and particles are both relatively insulative (FIGS. 2A and 2B) or conductive (FIGS. 2C and 2D) with respect to the fluid, i.e., via negative DEP from an insulative substrate or positive DEP from a conductive substrate.

ENHANCEMENT: In "enhancement," analytes are attracted to the substrate pores. FIG. 3 shows diagrams of this enhancement effect. If particles are larger than the pore size (FIGS. 3A and 3C), the attractive force tends to hold the particles to pores, even if the direction of the fluid flow is reversed. If particles are smaller than the pores (FIGS. 3B and 3D), this "enhancement" effect inhibits particles by restraining them from leaving the area immediately past the pores on the downstream side of the substrate. Lowering or releasing the electric field will permit such particles to escape the pores. This dielectrophoretic attraction enhances the concentration of particles at the pores and occurs when the porous substrate and particles are respectively relatively insulative and conductive (FIGS. 3A and 3B) or conductive and insulative (FIGS. 3C and 3D) with respect to the fluid, i.e., via positive DEP from an insulative substrate or negative DEP from a conductive substrate.

Figures 4A, 4B:
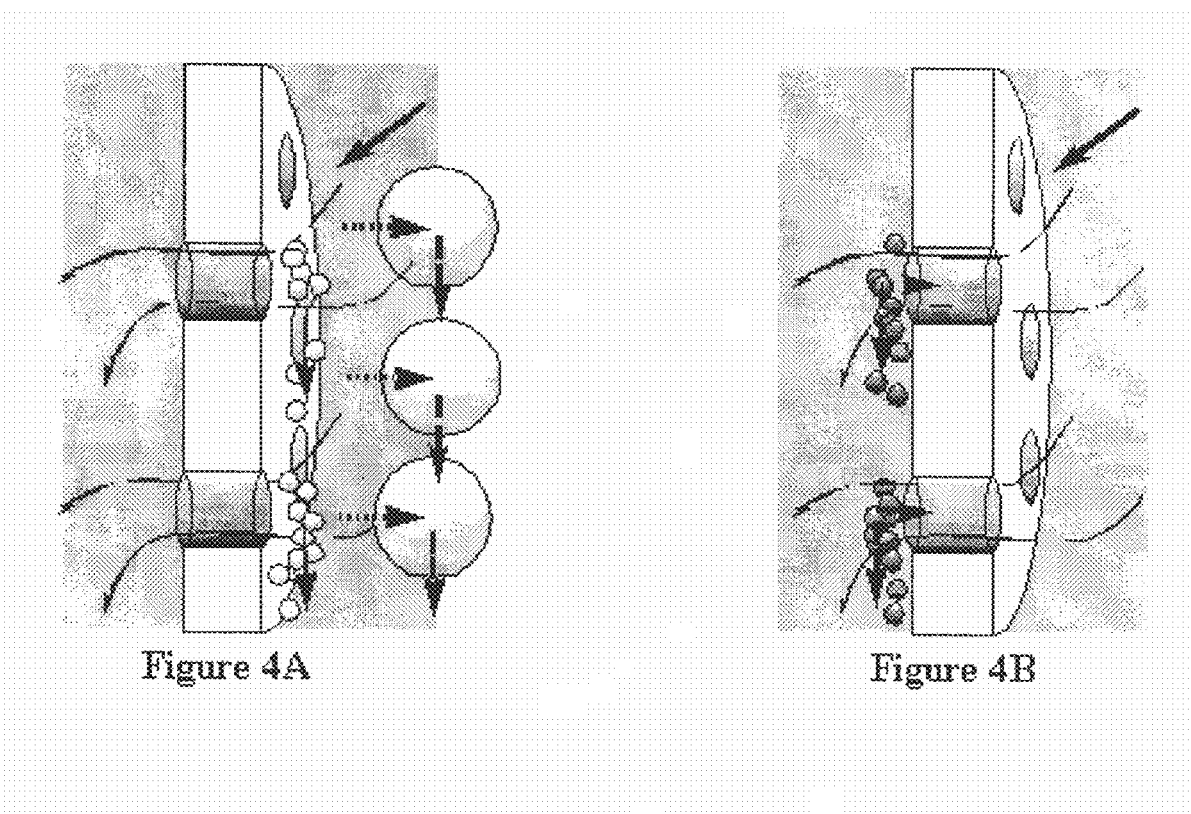
FIG. 4A shows a continuous-flow operation in depletion mode.
FIG. 4B shows a continuous-flow operation enhancement mode. By applying a tangential flow field, particles flow along the substrate. Depending on the pore topography and mechanism (depletion or enhancement), pulsed electric fields may be required to allow particles to escape momentarily from dielectrophoretic traps so that they are tangentially mobile.

CONTINUOUS FLOW: Embodiments of this invention can employ particle inhibition to effect a continuous concentration. If the substrate is arranged so that there is a tangential flow component, particles that are inhibited from crossing the substrate may yet be mobile to flow tangentially along the substrate. Devices comprising this arrangement facilitate continuous particle concentration, thereby allowing continuous delivery of a stream of selected or concentrated particles to a desired port or region of the device. In such cases, the substrate or fluid flow is fashioned such that a component of the mobilization field, e.g., the applied electric and/or hydrodynamic flow field, is tangential to the substrate surface. In this case, inhibited particles can flow along the substrate, as shown in FIG. 4. Generally, depletion inhibition (FIG. 4A) is preferred for devices employing continuous concentration because the particles tend to be prevented from coming into contact with the substrate, which can impede or prevent tangential motion. Among the strengths of this continuous flow approach is the ability to concentrate particles in multiple dimensions for high concentration factor, the ability to avoid saturation and non-ideal effects produced by high particle concentration, and the ability to collect and clear particles continuously from the filter.

ARRANGEMENTS OF ELEMENTS: Devices of the present invention comprise at least two electrodes to apply an electric field and at least one porous substrate. In some embodiments, one or more physically remote electrodes may be used. A remote electrode is one which is located a distance away from the porous substrate. Remote electrodes include pin electrodes in a fluidic reservoir. Preferred distances range from about 1 mm to about 5 cm. If the substrate comprises a conductive material, in some embodiments the substrate is held at a potential, frequency, and/or phase different from that of another electrode or electrodes so the substrate itself is an electrode. In other embodiments, the substrate is in electrical communication only with the liquid.

Embodiments of the present invention comprise at least one porous component and at least two conductive components. Each porous component has a plurality of pores capable of producing nonuniformities in an applied electric field such that local field extrema exist near the pores. The porous component further comprises at least one insulative or conductive porous substrate described herein.

The two or more conductive components apply an electric field to the fluid within the device. These conductive components can be directly or capacitively coupled to the fluid. One or more of these conductive components can have pores to allow passage of the fluid. Any conductive components having pores could embody a spatially nonuniform substrate as described herein. One or more of these conductive components may be a fluid in electrical communication with an externally applied field. A conductive component may be a solid or coated conductor or semiconductor ring, pin, mesh, grid electrode, or a combination thereof.

FIG. 5 shows various arrangements of the porous components and conductive components, the electric field lines and particle trapping locations. FIG. 5A shows an asymmetric arrangement of porous electrode and remote or planar electrode. FIG. 5B shows a symmetric porous electrode pair. FIG. 5C shows a symmetric planar or remote electrode pair with a conductive porous component. FIG. 5D shows a symmetric planar or remote electrode with an insulative porous component.

Figure 6A:
FIG. 6A shows a DEP element assembly comprising a porous insulator with two remote electrodes.
Figure 6B:
FIG. 6B shows a DEP element assembly comprising a porous conductor with two remote electrodes.
Figure 6C:
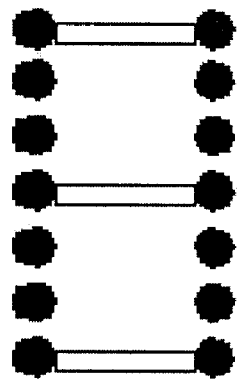
FIG. 6C shows a DEP element assembly comprising two porous electrodes separated by a wide spacer.
Figure 6D:
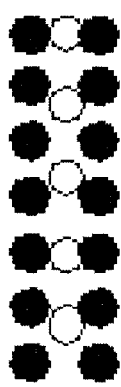
FIG. 6D shows a DEP element assembly comprising two porous electrodes separated by a thin spacer.
Figure 6E:
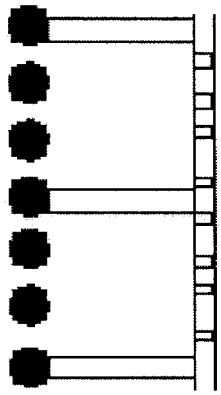
FIG. 6E shows a DEP element assembly comprising a porous electrode, wide spacer, porous insulator and remote electrode.
Figure 6F:
FIG. 6F shows a DEP element assembly comprising a porous electrode, thin spacer, porous insulator and remote electrode.
Figure 6G:
FIG. 6G shows a DEP element assembly comprising a porous electrode, porous insulator and remote electrode.
Figure 6H:
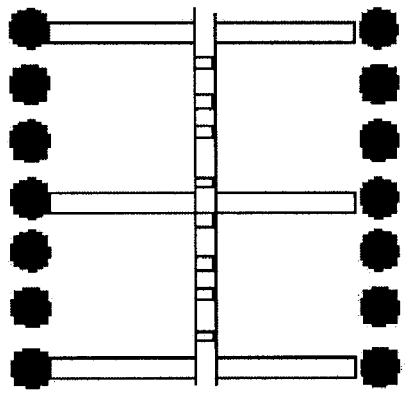
FIG. 6H shows a DEP element assembly comprising two porous electrodes, two wide spacers, and a porous insulator.
Figure 6I:
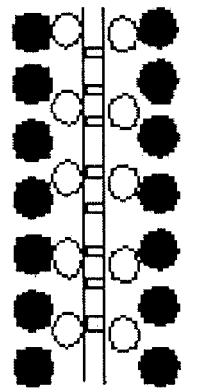
FIG. 6I shows a DEP element assembly comprising two porous electrodes, two narrow spacers, and a porous insulator.
Figure 6J:
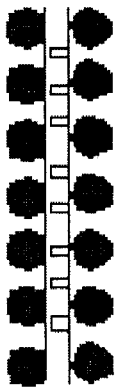
FIG. 6J shows a DEP element assembly comprising a two porous electrodes, and a porous insulator.
Figure 7:
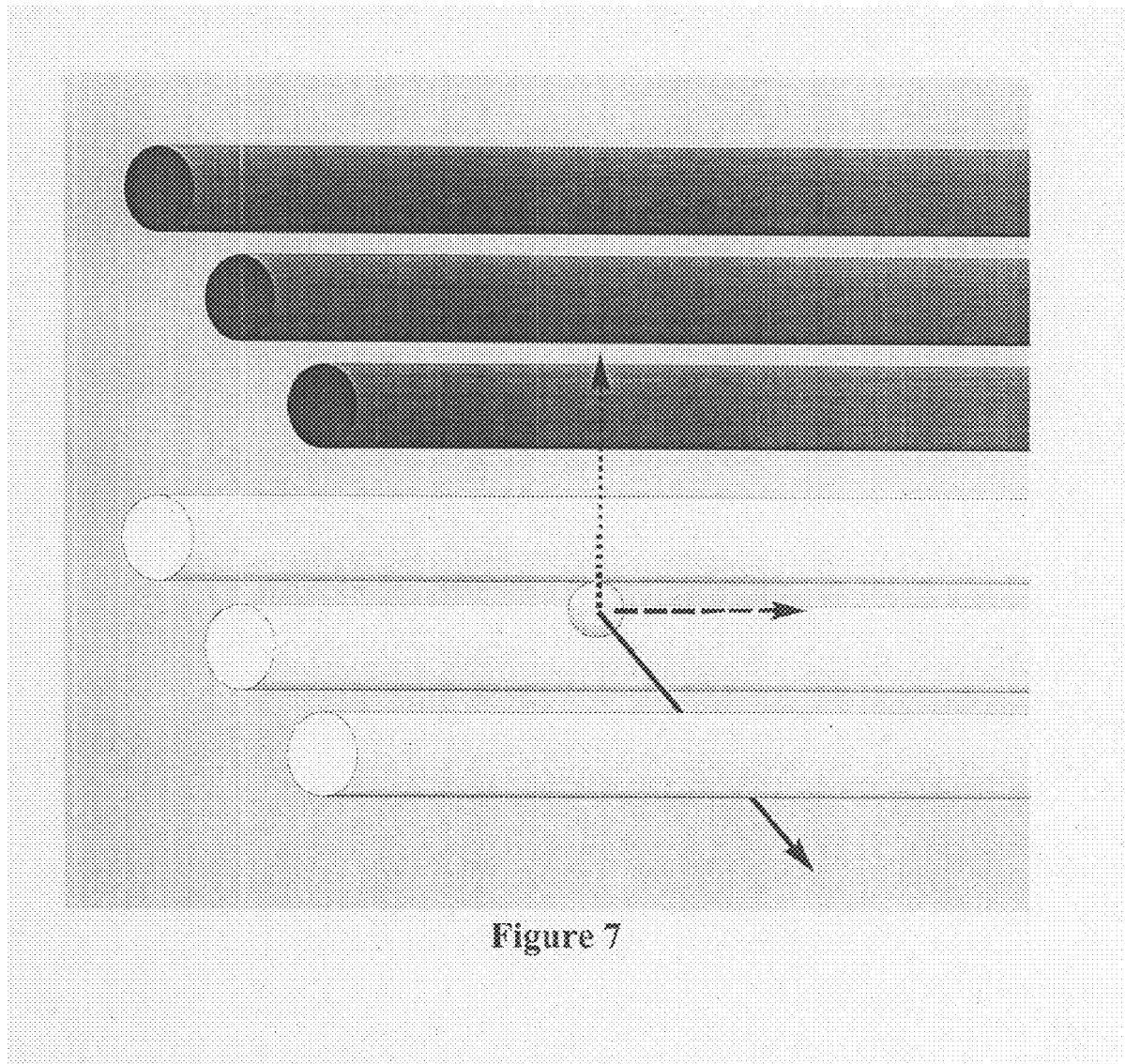
FIG. 7 shows a diagram of aligned fibers used to enhance continuous-flow operation.

ASSEMBLIES OF COMPONENTS: In some embodiments, the components are arranged into assemblies. In various embodiments, the assemblies comprise wide spacers to separate and substantially isolate the components, narrow spacers to provide partial isolation, or no spacers so that different components contact each other. FIG. 6 shows examples of DEP element assemblies employed in different embodiments. Black circles are porous electrodes; white circles are porous insulating spacers; white rectangles are wide insulating spacers. FIG. 6A shows a porous insulator with two remote electrodes. FIG. 6B shows a porous conductor with two remote electrodes. FIG. 6C shows a sandwich of two porous electrodes separated by a wide spacer. The spacer is wide enough that the electric field produced by the electrodes is substantially uniform between the electrodes so the field nonuniformities are produced only by the spatial nonuniformity of the individual electrodes. FIG. 6D shows a sandwich of two porous electrodes separated by a thin spacer. The thin spacer reduces but does not eliminate field nonuniformities produced by the nonuniformity in electrode spacing; however, it prevents the electrode from directly contacting samples that are immobilized near the substrate. FIG. 6E shows a sandwich assembly comprising a porous electrode, a wide spacer, and a porous insulator with a remote electrode. Again, the wide spacer reduces interactions between the nonuniformities produced by the porous elements. FIG. 6F shows a sandwich assembly comprising a porous electrode, a thin spacer, and a porous insulator with a remote electrode. Again, the thin spacer reduces, but does not eliminate coupling of the field nonuniformities produced by the other porous elements. FIG. 6G shows a sandwich assembly comprising a porous electrode and porous insulator with a remote electrode. The field nonuniformities created by the porous electrode and insulators are closely coupled. FIG. 6H shows a sandwich of two porous electrodes, two wide spacers, and a porous insulator. FIG. 6I shows a sandwich of two porous electrodes, two narrow spacers, and a porous insulator. FIG. 6J shows a sandwich of two porous electrodes and a porous insulator.

One skilled in the art may readily employ spacers and select the size of spacers in order to obtain a desired result. Wide spacers ranging from about 100 to about 1000 microns, e.g., injection-molded plastic honeycomb or ridges, are sufficiently wide that the applied electric field is substantially uniform before reaching another element. These wide spacers are favored for selectivity since close coupling of non-uniform fields tend to create extra variation in the field concentration and dielectrophoretic effects unless the interacting elements are carefully patterned and aligned. Disadvantages of the wide spacers are higher voltage and power requirements, increased complexity in assembly, and complexity in developing continuous-flow designs, since the spacers must allow particles to flow along porous surfaces. The narrow spacers ranging from about 25 to about 100 microns, e.g., an insulating mesh, are wide enough to minimize contact of the electrodes with immobilized samples, but do not completely eliminate coupling. Close coupling (no spacer) is simplest in many embodiments, but can complicate continuous flow device designs since the electrodes and other elements must be arranged to allow particles to flow and local electrochemical products can affect performance and cell viability.

As used herein, the size range of the spacers is generally related to the pore size, e.g. a "wide" spacer is greater than about 3 times the pore size and a "narrow" spacer is less than about 3 times the pore size. One skilled in the art may readily determine the maximum size for a wide spacer which is limited by the given device, efficiency and practical limits.

In all arrangements of FIG. 6, a preferred arrangement of electrodes and/or insulative or conductive component for continuous flow devices is substantially aligned fibers. As in the diagram of FIG. 7, these fibers can be aligned with the desired particle paths during continuous-mode operation to minimize unwanted trapping and maximize selectivity. While the spacing of these aligned fibers can be random, best selectivity occurs when the spacing is uniform.

Figure 8A:
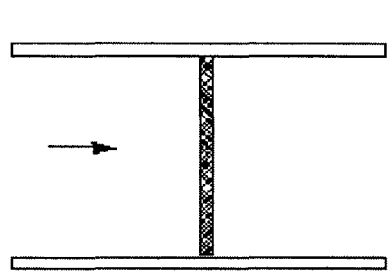
FIG. 8A is an example of a transverse gated concentrator device.
Figure 8B:
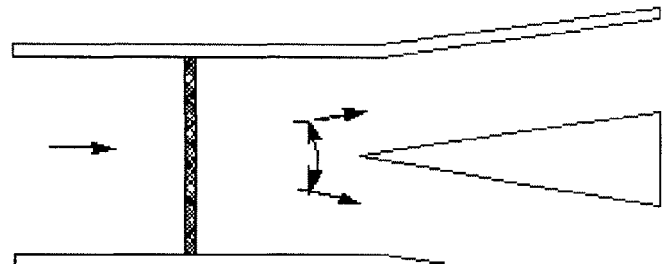
FIG. 8B is an example of a transverse switched concentrator device.
Figure 8C:
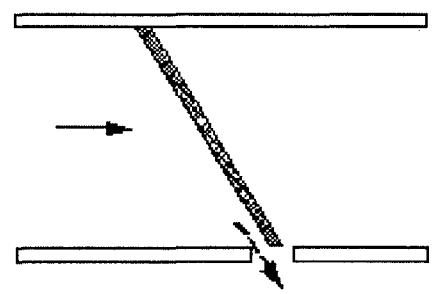
FIG. 8C is an example of a one- or two-dimensional focusing concentrator device.
Figure 8D:
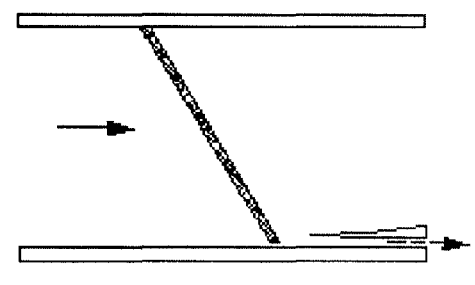
FIG. 8D is an example of a one- or two-dimensional focusing concentrator device with alternate port geometry.
Figure 8E:
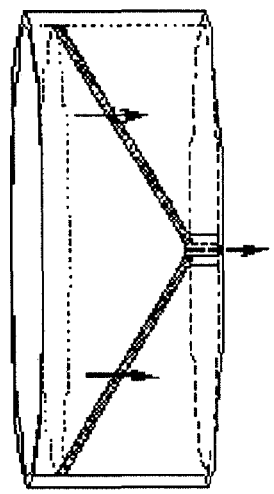
FIG. 8E is an example of a two- or three-dimensional focusing concentrator device with alternate port geometry.

DEVICE ARCHITECTURES: FIG. 8 shows batch and continuous flow device arrangements of the present invention. FIG. 8A shows a transverse gated batch concentrator. Particles are collected when a sufficiently high electric field is applied and are released by lowering or otherwise adjusting the applied electric field and/or raising or changing direction of the flow field. Particles can be eluted back up the channel by reversing the flow direction. Particles that are smaller than the pores can be eluted down the channel (passing through the assembly). FIG. 8B shows a transverse switched batch concentrator. This embodiment is controlled like the gated batch concentrator; however, during concentration, the applied electric and/or pressure fields cause the filtered liquid to pass through one port (solid arrow). During release, applied electric and/or pressure fields elute the concentrate through the other port. As in FIG. 8A, the particles can be eluted back up the channel if the concentrate port is arranged oppositely (not shown). FIG. 8C shows a one-dimensional focusing concentrator. The downstream termination of the assembly can be designed to have a relatively weak dielectrophoretic force and/or relatively strong mobilizing force so that particles spill continuously off the downstream end. The termination can alternatively be designed to have a relatively strong dielectrophoretic force and/or weak mobilizing force to collect particles. Such an arrangement is a hybrid continuous and batch concentrator and can be operated using the descriptions in FIGS. 8A and 8B. The optional port at the bottom allows continuous or gated collection of concentrate. FIG. 8D shows a one-dimensional focusing concentrator with an alternate port geometry. FIG. 8E shows a two-dimensional focusing geometry. The concentrate can be immobilized or continuously eluted at the vertex of the cone. Other two-dimensional focusing geometries include partial conical segments, intersecting tilted planar facets, and the like.

Figure 9:
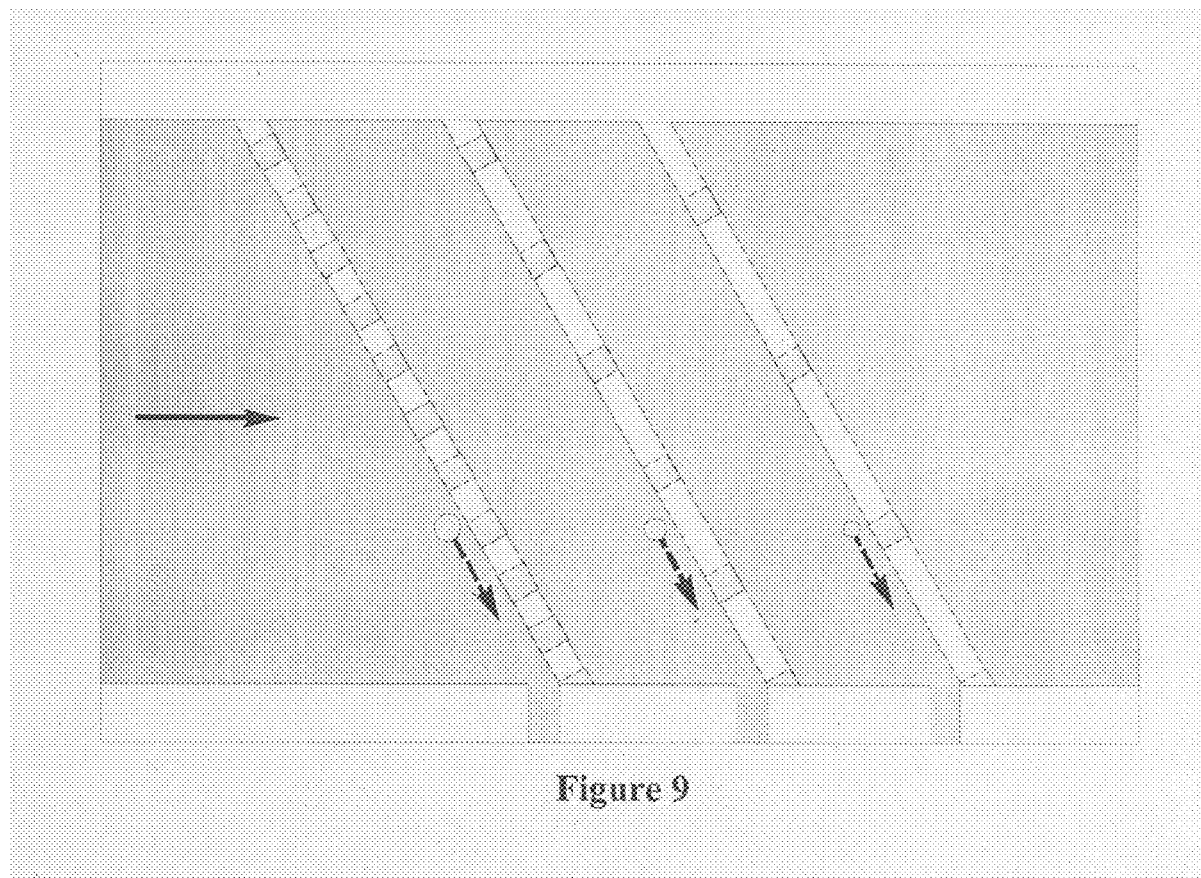
FIG. 9 shows an example of a staged device according to the present invention.

STAGING: The batch and continuous flow device arrangements can be staged so the flow passes sequentially through one assembly then another and so on in such a way that particles are collected in different fractions based on their characteristics. These staged assemblies can share one or more electrodes. The staged assemblies may have the same or different properties such as conductivity, porosity, pore size, fiber size, fiber spacing, fiber alignment angle, applied field magnitude, and applied field frequency to effect assemblies that produce different dielectrophoretic forces. The electric fields may be switched on and off for each assembly in order to shuffle dielectrophoretically active particles between the assemblies. FIG. 9 shows an example of a system composed of three stages that share remote electrodes. Each stage has progressively lower porosity, thus the electric field concentration at the substrate progressively increases, sorting particles into three different locations in order of decreasing size or conductivity difference.

Thus, the present invention provides methods and devices for batch (pulsed) and/or continuous separation, isolation, or collection of desired analytes by dielectrophoretic depletion or enhancement in a fluid flow.

The devices of the present invention may be arranged and housed in a variety of ways to effect selective batch (pulsed) concentration, continuous concentration, or hybrid continuous and batch concentration. Some embodiments employ assemblies held transverse to the flow. Other embodiments employ assemblies that are tilted with respect to the flow to force inhibited particles to flow along the substrate to be continuously spilled at the downstream end of the assembly, effecting a one-dimensional concentration, or immobilized, effecting a two-dimensional concentration (one spatial dimension and time). Other embodiments use two-dimensional focusing geometries, e.g. conical assemblies, to effect a two-dimensional continuous concentration or three-dimensional batch concentration, supporting high concentration factors. For example, the assemblies may be arranged within a cylindrical container or the assemblies may be cylindrical and arranged concentrically around a central electrode (in this manner, each concentric substrate will experience a different local field and gradient without the need to employ electrodes between each substrate and its neighbor.

Figure 10:
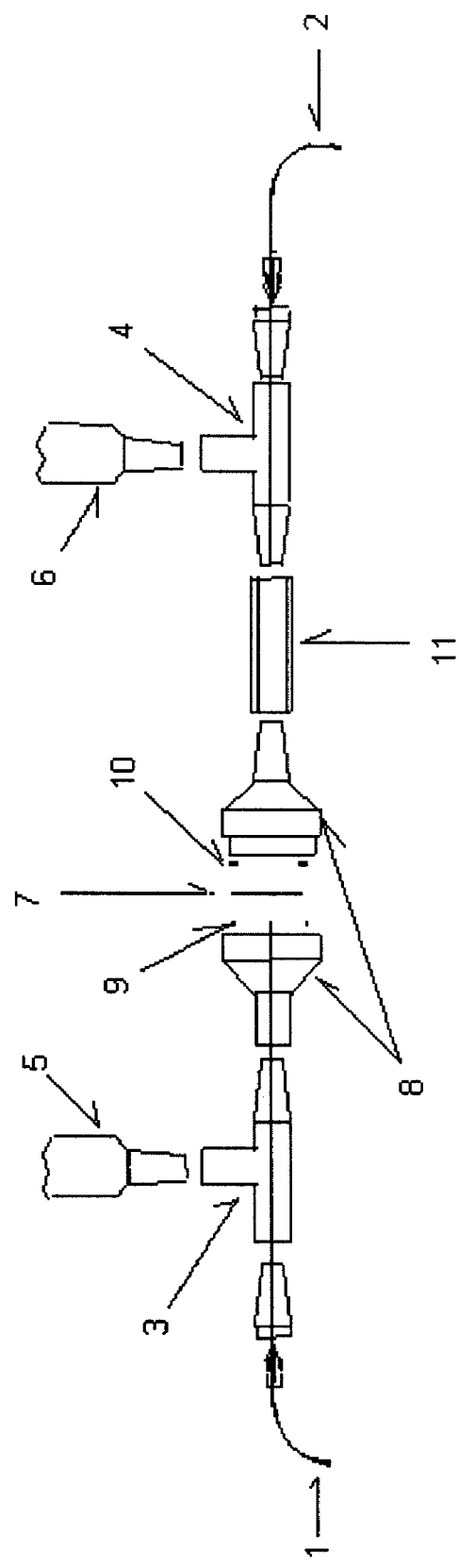
FIG. 10 shows a diagram of a device according to the present invention.

EXAMPLE EMBODIMENT: FIG. 10 shows a diagram of a device of the present invention. The device has a first electrode (1) and a second electrode (2) integrated into a fluid inlet (3) and a fluid outlet (4). In some embodiments, the electrodes are pin electrodes, such as wires, preferably platinum wires. The electrodes may be an integral part of the device, for example, formed on the device housing, or free standing. The electrodes are attached to a source of DC or AC electrical waveforms, to apply an electric field within the device. Pressure-driven flow may be driven passively by gravity or inlet to outlet pressure differentials, or actively via a delivery device (5), e.g., a syringe, centrifugal, gear, peristaltic, or positive-displacement pump. The collection device (6) may be a vial, fraction collector, online detector, fluorescence detector, flow cytometer, and the like. The dielectrophoretic device can be connected to the delivery and collection device through Luer-Lock or standard chromatography interconnects known in the art. As shown in FIG. 10, the substrate (7) is located within a substrate housing (8). The substrate housing (8) may further utilize a gasket (9) to seal and electrically isolate the device. The substrate housing (8) may further comprise an insert (10) which provides for establishing specific clearances between the electrodes and the membrane, as well as defining the total volume of the effective membrane area. The device of the present invention may further comprise a viewing area (11) that allows viewing and recording of the particles and fluid flow.

Figure 11:
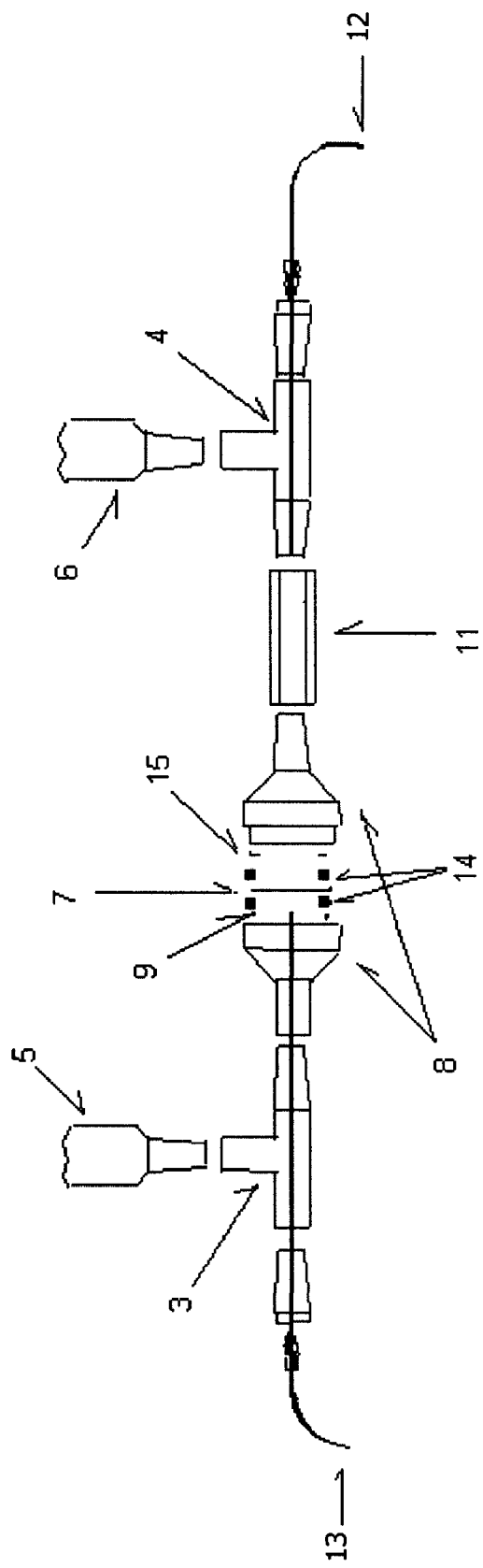
FIG. 11 shows a diagram of another device according to the present invention.

The devices of the present invention include various electrode geometries and placements that may be readily realized by those skilled in the art. For example, FIG. 11 shows one pin electrode (12) and one mesh electrode (13), having a mesh size greater than the substrate (7) pore size, that are integrated into a fluid inlet (3) and a fluid outlet (4) of the device. In preferred embodiments, the mesh electrode (13) is located in the substrate housing (8) in close proximity to the substrate (7) in order to eliminate or reduce entry length effects, and thus a fully developed flow and electric field is present at the point of entry to the substrate (7). In some embodiments, the substrate housing (8) further includes a grid (14) which acts as a support for the membrane. In some embodiments, the substrate housing (8) further includes a spacer (5) which defines the distance between the electrodes and the membrane material.

Various geometries and device configurations may, according to the present invention, be readily designed by one skilled in the art for desired versatility and performance.

As provided in the Examples, it has been determined that a device according to the present invention can remove organic particles smaller than the nominal pore size of the filter with high efficiency from a stream of fluid (water representative fluid sample) flowing at a rate of about 10 ml/hr. This effect is apparent for 100-nm fluorescent polystyrene beads, (representative analyte) passing through a filtration system having 200-run-diameter pores when 6000 V DC is applied across the substrate housing. When the voltage is applied, little fluorescence is observed in the effluent flow. When voltage is discontinued, the effluent flow is observed to return to close to its original fluorescence. This experiment qualitatively demonstrates that electric fields can be used to enhance the ability of a macroscopic filtration unit to trap certain types of particles.

The following examples are intended to illustrate but not to limit the invention.

EXAMPLE 1

The background solution was prepared by titrating deionized water from a reverse osmosis filter with NaOH to an approximate pH of 8. The resulting solution possessed a conductivity of approximately 2 μS/mm. A suspension of 100-nm rhodamine dyed fluorescent polystyrene spheres (analyte), fluorospheres MOLECULAR PROBES® (Invitrogen, Eugene, Oreg.) was diluted 1:1,000 in the background solution from at 2% wt. stock suspension and sonicated for 2 minutes.

An apparatus similar to the one shown in FIG. 10 was assembled. The substrate and substrate housing employed was a filter cartridge, a one-piece, self-priming adult IV filter with 200 nm pore diameter (Qosina, Edgewood, N.Y.). The fluid outlet of the T joint was fitted with a tapered adaptor (Small Parts, Miami Lakes, Fla.) that allowed it to be inserted into a custom PDMS manifold designed to seal syringe tips to the reservoirs of microfluidic channels. The viewing area was a microchannel molded from transparent ZEONOR® 1060 resin (Zeon Chemicals, Louisville, Ky.) which enabled one to visualize the fluorescence of the filter effluent. The device was then placed on the stage of an Olympus IX70 (Napa, Calif.) inverted fluorescence microscope. A Chroma 51006 filter set (Rockingham, Vt.) was used.

About 6000 Volts were applied across the electrodes for intervals of 3 to 10 minutes. The channel was imaged at the reservoir, where the optical path facilitated fluorescence measurements. Series of 100 images at 10 fps were taken of the system before applying voltage, when the fluorescent intensity of the reservoir was observed to decrease because of particle trapping at the porous substrate when the field was applied. When the field was removed, this fluorescence intensity signal was observed to increase as the particles eluted through the porous substrate. This effect was observed to be reproducible and efficient in the removal of this analyte from the system of use.

EXAMPLE 2

The background solution was prepared by titrating deionized water from a reverse osmosis filter with NaOH to an approximate pH of 8. The resulting solution possessed a conductivity of approximately 2 μS/mm. A suspension of 2-μm carboxylate modified fluorescent polystyrene spheres (analyte), fluorospheres MOLECULAR PROBES® (Invitrogen, Eugene, Oreg.) was diluted 3:100,000 in the background solution from a 2% by wt. stock suspension and sonicated for 2 minutes.

A device similar to the one described in FIG. 10 was employed. The substrate was a Small Parts (Miami Lakes, Fla.) nylon filter of either 5 μm, 20 μm, or 105 μm pore size. The fluid outlet of the downstream T joint was fitted with a tapered adaptor (Small Parts, Miami Lakes, Fla.) and connected to a spectroscopic flow cell (Stama Cells, Atascadero, Calif.) with an optical path 100 μm. The filter effluent was then imaged through the flow cell using an Olympus IX70 (Napa, Calif.) inverted fluorescence microscope and a Chroma 51006 filter set (Rockingham, Vt.). Images were recorded with a Macrofire digital video camera (Optronics, Goleta, Calif.).

Figure 12:
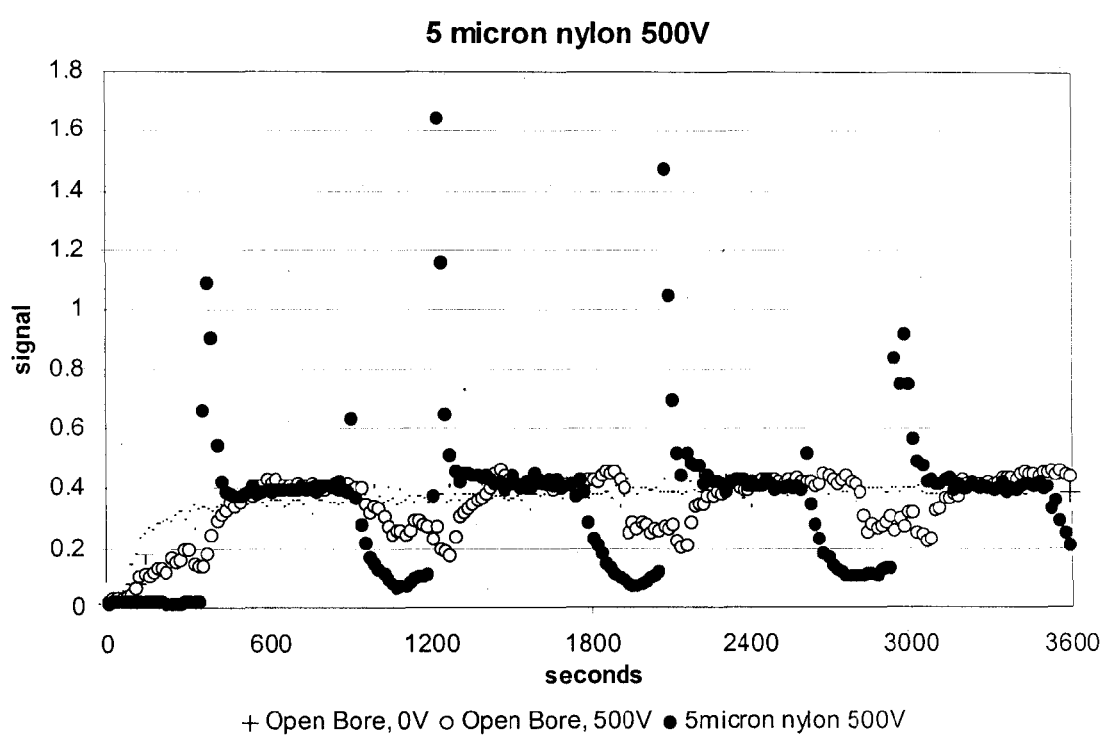
FIG. 12 shows a plot of the particle concentration versus time of the operation of a device similar to the device of FIG. 10.

FIG. 12 shows the fluorescence intensity produced by the fluorosphere suspension as recorded downstream from the dielectrophoretic device. The curves represent the average pixel brightness for a series of time lapse photographs of device effluent versus time. The photographs were taken at a rate of 1 frame per second and each data point on the graph represents a time average of 15 frame measurements. The sequence was processed with a threshold filter set to a grayscale threshold of 100 to remove background and increase contrast. Average pixel brightness measurements were then performed for each image in the filtered sequence. This assay method was demonstrated to produce signals that vary linearly with tracer concentration within the range of interest. For the demonstration in FIG. 12, the fluorosphere suspension was introduced into a device primed with deionized water at t=0. Also starting at t=0, 500 VDC was applied to the device for 5 minutes, followed by 0V for 10 minutes and then repeating in a cycle. The elution curve produced by a device fitted with a 5 μm pore diameter filter is presented along with the elution curve generated by the device subjected to the same voltage inputs in the absence of the filter. The elution curves for the device in the absence of applied voltage and without the 5 μm filter is also included for comparison. It is clearly demonstrated that the presence of the filter increases both the fraction of particles that are trapped by the device when voltage is applied, and increases the concentration of particles in the device effluent immediately after voltage is discontinued. The increased amplitude of the peaks and troughs of the elution curve for the filter-equipped device is attributable to insulator-based dielectrophoresis. Furthermore, a comparison of the fluorescence intensity observed following the elution peaks with the baseline fluorescence intensity in the absence of a filter or applied voltage demonstrates that the 5 μm filter does little to impede the passage of fluorospheres when voltage is not applied. These results demonstrate the effectiveness of the device in removing particles from a bulk fluid flow. Therefore, the substrates according to the present invention may be used to assay or isolate analytes from fluid samples.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures described herein are exemplary only and that various other alternatives, adaptations, and modifications may be made within the scope of the present invention. Accordingly, the present invention is not limited to the specific embodiments as illustrated herein, but is only limited by the following claims.

We claim:

1. A device for separating or concentrating analytes in a fluid sample, comprising:
   a fluid conduit comprising an inlet and an outlet port;
   a fluid flowing in a direction between de fluid conduit inlet and outlet, the fluid comprising one or more analytes;
   at least one filter member comprising a substrate having a plurality of pores, the filter member spanning a cross section of the fluid conduit;
   first and second electrodes;
   the electrodes attached to a source of DC or AC electrical waveforms, to apply an electric field within the device;
   wherein said substrate is formed from a plurality of aligned fibers.

2. The device of claim 1, wherein the fluid is in contact with the substrate and to each of the electrodes.

3. The device of claim 1, wherein the non-uniform electric field potential is applied across the first and second electrodes, creating thereby a local extrema disposed adjacent to each of the plurality of pores.

4. The device of claim 1, wherein the substrate is a membrane or a film.

5. The device of claim 4, wherein the substrate comprises an insulating material.

6. The device of claim 4, wherein the substrate a conductive material.

7. The device of claim 1, wherein one of the electrodes is a pin electrode or a wire mesh.

8. The device of claim 1, wherein one of the electrodes is a remote electrode.

9. The device of claim 1, and further comprising at least one component selected from the group consisting of, a gasket, an insert, a viewing area, a delivery device, a collection device, a spacer, and a valve.

10. The device of claim 1, wherein the substrate is aligned about 80 degree incidence to about 10 degree incidence to the flow of the fluid flow.

11. The device of claim 1, wherein the substrate is aligned substantially normal to the flow of the fluid flow.

12. A device for separating or concentrating analytes in a fluid sample, comprising:
    a fluid conduit comprising an inlet and an outlet port;
    a fluid flowing in a direction between de fluid conduit inlet and outlet, the fluid comprising one or more analytes;
    at least two filter members comprising a substrate having a plurality of pores, the filter member spanning a cross section of the fluid conduit;
    first and second electrodes;
    the electrodes attached to a source of DC or AC electrical waveforms, to apply an electric field within the device;
    wherein each of the filter members is sequentially disposed within the fluid conduit and each proximate to a separate one of the one or more collection ports.

13. The device of claim 12, wherein the substrate is a woven structure of a plurality of fibers.

14. The device of claim 12, wherein the substrate is a non-woven structure of a plurality of fibers.

15. The device of claim 12, wherein the two or more filter members are aligned about 80 degree incidence to about 10 degree incidence to the flow of the fluid.

16. The device of claim 12, wherein the two or more filter members are aligned substantially normal to the flow of the fluid.

* * * * *